Nov. 10, 1931.  J. A. E. EYSTER  1,830,829
INSTRUMENT FOR MEASURING VENOUS PRESSURE
Filed March 14, 1928  2 Sheets-Sheet 1
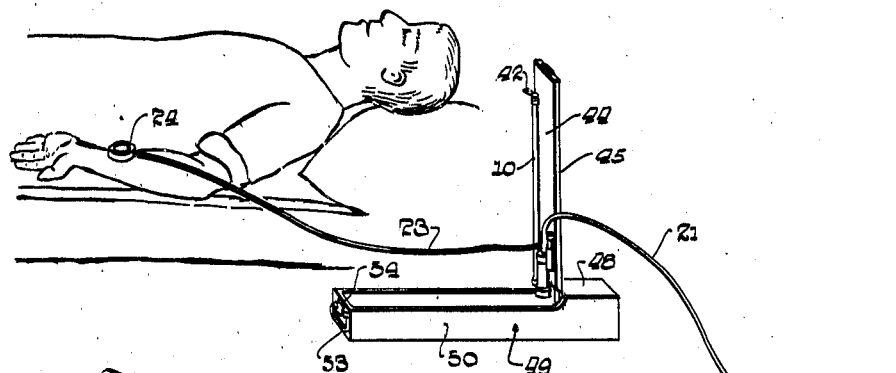
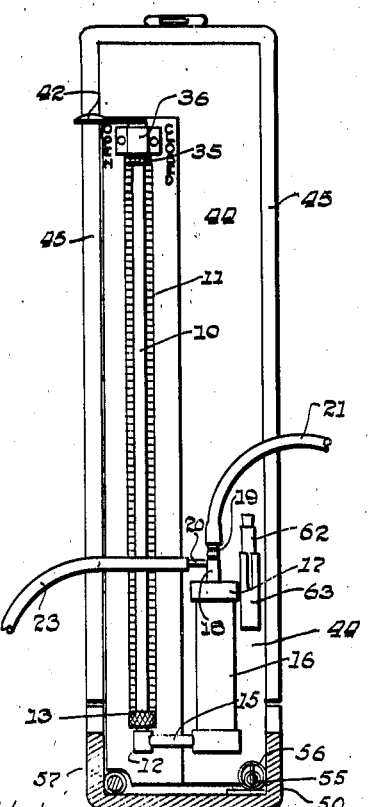
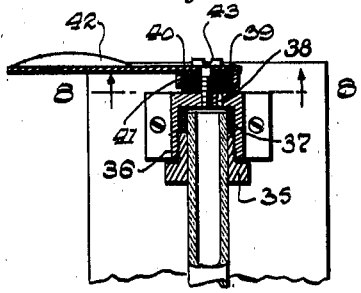
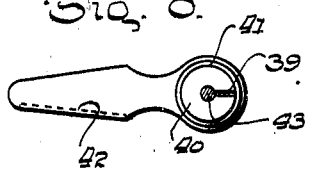
Inventor,
John A. E. Eyster,
By George I. Haight
Atty.
Witness
William P. Kilroy Nov. 10, 1931. J. A. E. EYSTER 1,830,829
INSTRUMENT FOR MEASURING VENOUS PRESSURE
Filed March 14, 1928 2 Sheets-Sheet 2
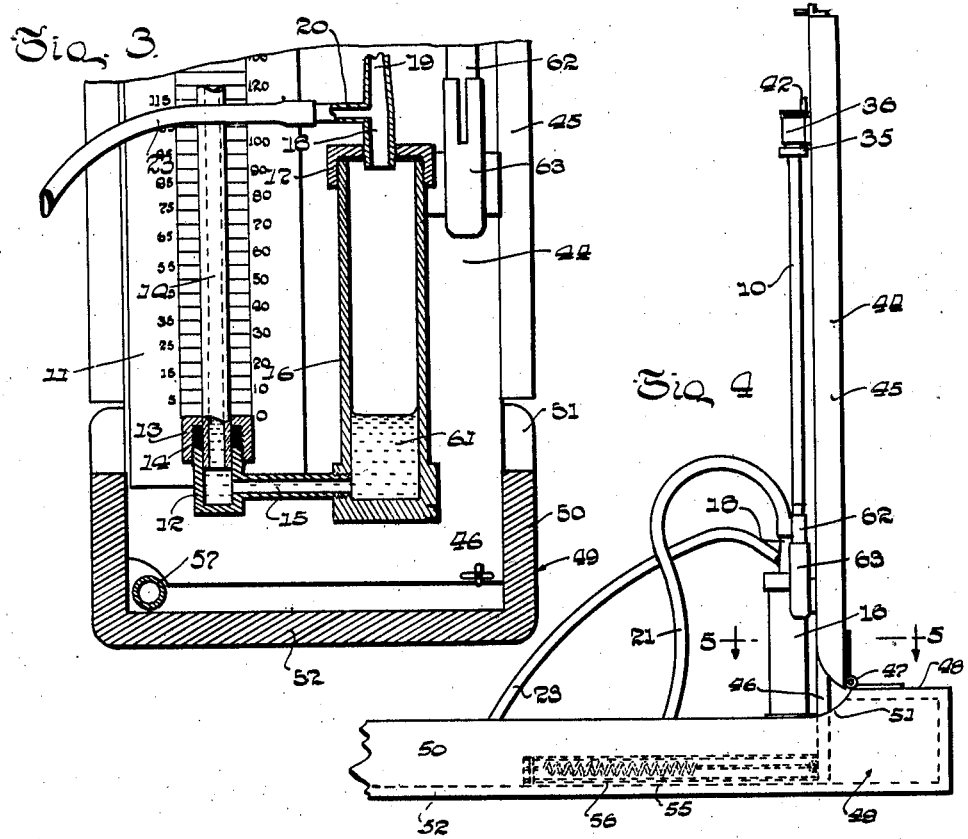
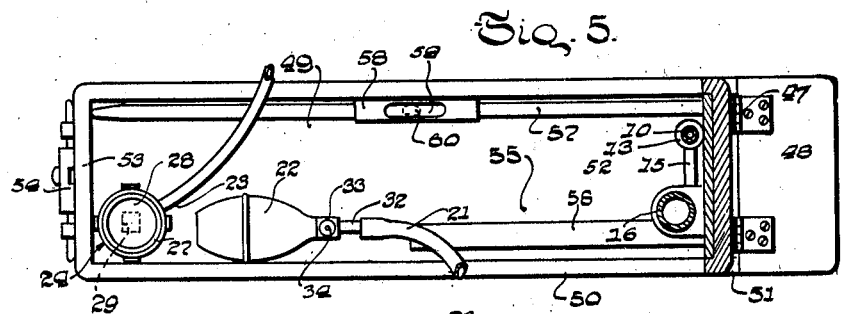
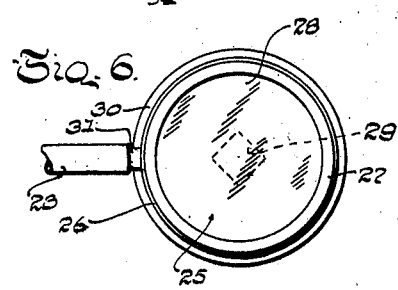
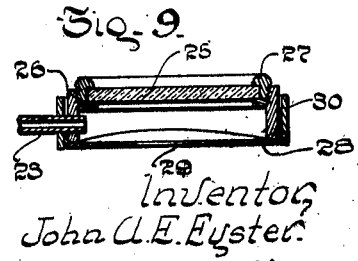
Inventor
John A. E. Eyster
By George I. Haight
His Atty.
Witness
William P. Kilroy Patented Nov. 10. 1931

1,830,829

UNITED STATES PATENT OFFICE

JOHN A. E. EYSTER, OF MADISON, WISCONSIN, ASSIGNOR TO WISCONSIN ALUMNI RESEARCH FOUNDATION, A CORPORATION

INSTRUMENT FOR MEASURING VENOUS PRESSURE

Application filed March 14, 1928. Serial No. 261,535.

The present invention relates to an instrument designed to measure the pressure of venous blood, which is a procedure which at the present time is recognized as important in the diagnosis and treatment of various diseases, particularly diseases of the heart.

In normal conditions, venous pressures will range, roughly, between four and ten centimeters of water, but in cases of serious "cardiac decompensation," or heart enlargement, the venous pressures will range around twenty centimeters of water, or higher.

The object of the present invention is to provide an instrument which will reliably measure the pressures in question, and to so construct and mount the instrument that it will be convenient to use, and adaptable to varying conditions.

In instruments of this character, provision must be made for the mounting and supporting of the instrument in such a way that the physician or other observer will be enabled by careful manipulation to secure an accurate record, and in the present instance the method of constructing and mounting the instrument is one which conforms to these requirements.

Further objects and details of the invention will appear from the description thereof, in conjunction with the accompanying drawings, wherein—

Figure 1 is a perspective view showing the manner of using the invention;

Fig. 2 is an elevation of the pressure and gauge portions of the invention;

Fig. 3 is a sectional detail, showing the pressure cylinder and its connection with the gauge glass;

Fig. 4 is a side elevation of the instrument elevated from the base;

Fig. 5 is a view of the base or housing, taken on line 5—5 of Fig. 4;

Fig. 6 is an enlarged plan view of the air chamber for application to the body;

Fig. 7 is a section of the air vent on the gauge glass;

Fig. 8 is a detail showing the valve arrangement at the outer end of the gauge glass; and Fig. 9 is a section of the air chamber.

The apparatus comprises a gauge glass 10 mounted upon a graduated plate 11, which as shown is graduated in multiples of 5 to indicate millimeters of rise of the liquid contained in the gauge glass. The gauge glass is of tubular formation, and its lower end is entered into a metallic socket 12 upon which is screw-threaded an apertured cap 13 which compresses a packing 14 to hold the glass in sealed relation to the socket.

The socket receives a tube 15 which is entered into the base of a pressure cylinder 16 closed at its upper end by a cap 17 which receives a T-coupling 18 provided with an upwardly extending nipple 19 and a laterally extending nipple 20.

The upwardly extending nipple receives a rubber tube 21 terminating in a rubber bulb 22 for hand compression, while the laterally extending nipple receives a rubber tube 23 which leads to and connects with the air chamber disk 24 which is applied to a suitable portion of the human body, as, for instance, the wrist, to develop a pressure against the walls of a vein sufficient to cause a collapse of the vein, which is accompanied by a rise of the liquid in the gauge glass to a height indicative of the venous pressure, so that a reading of the gauge glass at the instant of collapse of the vein will give the required indication.

In order to seal the area of the body in immediate proximity to the vein under observation, so that the pressure developed in the apparatus will be effective in causing a collapse of the vein, the air chamber disk 24 is constructed as follows:

A glass disk shaped window 25 is provided which rests upon a circular inner wall 26, being held in place by a threaded ring 27. The lower edge of the inner ring shaped wall is convexly curved or arched to conform to the configuration of the wrist or back of the hand, and across the lower edge of this wall is drawn a thin rubber sheet or diaphragm 28 provided in its center with an aperture 29 through which the vein under observation will be exposed so that it may be inspected through the window 25. The edges of the rubber sheet or diaphragm are engaged and clamped by an outer split ring 30 which constitutes, in effect, a split ring clamp serving to hold the rubber in distended condition across the bottom of the air chamber disk. The ends of the outer split ring are preferably notched to afford clearance for the outer projection of a nipple 31 which receives the end of the rubber tube 23.

The rubber bulb 22 is provided with a nipple 32 which receives the outer end of the rubber tube 21, and the nipple constitutes an extension from a metallic neck 33 which receives and seals the rubber bulb; and in the neck is formed a small air port 34 which may be conveniently closed by the thumb of the operator, as occasion may require, to prevent the escape of air.

The upper end of the gauge glass 10 is entered through a collar 35 and receives a cap 36 which serves to compress a rubber packing 37, thereby tightly sealing the upper end of the glass. The cap 36 is provided with a vent 38 which is adapted to register with a laterally extending vent 39 in a sealing disk 40, which is carried by and rotatable with a cap 41 from which extends an operating handle or lever 42.

A headed screw 43 affords an axial mounting for the sealing disk and cap, permitting rotation thereof to bring the air vent ports into register, as in Fig. 7, or to move them out of register, as occasion may require.

The gauge glass, with its graduated mounting, is supported upon a cover panel 44 provided with side flanges 45 which terminate short of the lower end 46 of the panel.

The panel is secured by a hinge 47 to the upper wall 48 of a box or casing 49, which, in conjunction with the panel when closed, constitutes a casing or housing for the instrument. The side walls 50 of the box 49 are shouldered near the rear end at the point 51, being rounded off on each side to register with the ends of the side flanges 45, which are also rounded in a way to permit closing of the cover panel. The box also comprises a bottom 52 and a front end wall 53, which front end wall carries a lock or latch 54 for holding the parts in closed relation. The lower end 46 is so arranged that when the cover panel is closed, the projecting end will swing up underneath the rear top cross wall 48 of the box portion, and in order to hold the cover panel in vertical standing relation when it is desired to use the instrument, the projecting lower end has connected thereto a coil spring 55 mounted within a cylindrical tube 56 which lies within the bottom of the box, the parts being so arranged that the cover panel will be lowered under an increasing spring tension, which will prevent a slamming down of the cover in closed position, and will also serve to maintain the panel elevated without additional support when the instrument is set up for use.

The box also serves as a housing for a spirit level 57 the ends of which are entered into a medial socket member 58, which is slotted at 59 to expose a closed tube 60 which carries a liquid having therein a bubble for indicating when the level is in true horizontal position.

The pressure cylinder 16 contains a liquid 61, preferably colored, which under pressure will be forced up into the gauge glass to indicate the pressure required in causing the collapse of a vein.

When it is desired to use the instrument, it will be unlatched and the box portion supported upon a table, stand, or other convenient support, preferably near the bed of a patient undergoing observation. The cover panel will then be raised into vertical position and supported by the spring 55 in the manner indicated, after which the pressure test can be made.

In order to avoid the recording of hydrostatic pressure in the veins themselves, it is preferred to position that portion of the body under observation on substantially the level of the heart, although readings can be taken at other levels and suitable allowance made for variations in elevation as compared with the heart level. In order to ascertain the position at which the observation is taken with respect to the heart, the spirit level is removed from the box and one end adjusted in relation to the air chamber disk, with the other end in the vicinity of the heart, to ascertain whether the two are at the same elevation. The rubber diaphragm of the air chamber disk is then preferably coated with glycerine, which may be taken from a vial 62 carried within a socket 63 in the case or box, in order to secure a close seal between the rubber diaphragm and the skin of the patient, and thereafter the disk is pressed closely against the skin over the vein under observation, which allows the vein to be observed through the aperture in the diaphragm. The observer then squeezes the rubber bulb 22 which drives air into the pressure cylinder and forces down the liquid therein, which causes an elevation of the liquid in the gauge glass to a degree indicating the pressure in the pressure cylinder above the liquid.

The valve at the upper end of the gauge glass is open during this operation, so that the liquid will be free to rise in the gauge glass under the pressure behind it. The surface area of the liquid in the pressure cylinder being many times the surface area of the liquid in the gauge glass, a slight lowering of the liquid in the cylinder will cause a very substantial rise in the gauge glass, which is highly desirable in order to promote accuracy in the reading of the indication given. The pressure in the cylinder will be communicated to the air chamber disk and exert a corresponding pressure on the vein under observation, and the observer will know the instant at which the vein collapses under this pressure, and by also observing the reading at this instant will be enabled to tell the pressure of the blood in the vein. The collapse of the vein will be indicated by the sudden disappearance of the shadow of the vein through the skin.

In pressing the bulb, the observer will keep his thumb over the small aperture 34, so that the air pressure from the bulb will be communicated directly to the pressure cylinder.

The arrangement of the air valve at the upper end of the gauge glass is such that it will be impossible to close the cover panel while the valve is open, since in the open position the handle 42 will extend beyond the adjacent rim or flange 45 of the cover, and this arrangement serves as an indicator or warning to the user to turn the valve to its inward or closing position before shutting down the cover, thereby guarding against the escape of liquid from the air vent orifice leading from the gauge glass.

The capacity of the box or casing is such as to easily afford space for the housing of the bulb, air chamber disk and tube, so that when the instrument is not in use it will be housed in a neat and compact box, which is preferably provided with a handle, and makes it easy to carry.

I claim:

1. In an instrument for measuring venous pressure, in combination with means for applying and indicating pressure, a pressure transmitting member in communication therewith and adapted to fit over the skin in proximity to the vein to be observed for transmitting pressure to the vein to cause collapse thereof under indicated pressure, said member being in the form of a cylindrical hollow chamber having a glass window in its upper surface and having a flexible diaphragm clamped across its lower surface, said diaphragm being provided with an aperture to permit view of the vein under observation.

2. In an instrument for measuring venous pressure, in combination with means for applying and indicating pressure, a pressure transmitting member in communication therewith and adapted to fit over the skin in proximity to the vein to be observed for transmitting pressure to the vein to cause collapse thereof under indicated pressure, said member being in the form of a cylindrical chamber having a surrounding inner wall, a glass window secured to the outer rim of the inner wall, a flexible diaphragm provided with an aperture and overlying the lower edge of the inner wall, and an outer split wall surrounding the inner wall and clamping the flexible diaphragm between the two walls.

3. In an instrument for measuring venous pressure, in combination with means for applying and indicating pressure, a pressure transmitting member in communication therewith and adapted to fit over the skin in proximity to the vein to be observed for transmitting pressure to the vein to cause collapse thereof under indicated pressure, said member being in the form of a cylindrical chamber having a surrounding inner wall provided near its upper margin with interior screw threads, a glass window fitted within the threaded portion, a ring screw-threaded in said inner wall and bearing against the exterior of the glass window, a flexible diaphragm provided with an aperture and overlying the lower edge of the inner wall, and an outer split wall surrounding the inner wall and clamping the flexible diaphragm between the two walls.

In witness that I claim the foregoing I have hereunto subscribed my name this 2d day of March, 1928.

JOHN A. E. EYSTER.